(12) United States Patent
Scherf

(10) Patent No.: US 11,136,196 B2
(45) Date of Patent: Oct. 5, 2021

(54) DRIVER FOR SCRAPER CHAIN CONVEYORS

(71) Applicant: THIELE GMBH & CO. KG, Iserlohn (DE)

(72) Inventor: Burkhard Scherf, Bergkamen (DE)

(73) Assignee: THIELE GMBH & CO. KG, Iserlohn (DE)

( * ) Notice: Subject to any disclaimer, the term of this patent is extended or adjusted under 35 U.S.C. 154(b) by 0 days.

(21) Appl. No.: 16/955,874

(22) PCT Filed: Oct. 4, 2018

(86) PCT No.: PCT/DE2018/100825
§ 371 (c)(1),
(2) Date: Jun. 19, 2020

(87) PCT Pub. No.: WO2019/120361
PCT Pub. Date: Jun. 27, 2019

(65) Prior Publication Data
US 2020/0399070 A1    Dec. 24, 2020

(30) Foreign Application Priority Data
Dec. 20, 2017  (DE) ...................... 20 2017 107 766.7

(51) Int. Cl.
*B65G 19/24*   (2006.01)
*B65G 19/10*   (2006.01)
*E21F 13/06*   (2006.01)

(52) U.S. Cl.
CPC ............. *B65G 19/24* (2013.01); *B65G 19/10* (2013.01); *B65G 2207/48* (2013.01); *E21F 13/066* (2013.01)

(58) Field of Classification Search
CPC ...... B65G 19/24; B65G 19/245; B65G 19/26; B65G 19/265; B65G 19/22; B65G 19/225;
(Continued)

(56) References Cited

U.S. PATENT DOCUMENTS 2,761,548 A  *  9/1956  Long ...................... B65G 19/08
                                                                    198/733
2,792,928 A     5/1957  Holz
(Continued)

FOREIGN PATENT DOCUMENTS

CN      205076383        3/2016
DE      3317682 A1      11/1984
(Continued)

OTHER PUBLICATIONS

Office Action for Chinese Application 201880057509.6 dated Dec. 18, 2020; 13 pp.
(Continued)

*Primary Examiner* — Mark A Deuble
(74) *Attorney, Agent, or Firm* — Hauptman Ham, LLP

(57) ABSTRACT

The disclosure relates to a driver for scraper chain conveyors, which has a central portion having a chain link receptacle for attaching the driver to chain links of a conveyor chain, wherein scraper wings adjoin both sides of the central portion and each scraper wing has a web portion and an end portion that is widened with respect to the web portion, wherein, on the underside of the web portion, a wear plate is provided, which covers the web portion in the direction of the end portion starting from a step on the underside of the central portion.

17 Claims, 24 Drawing Sheets

(58) Field of Classification Search
CPC ........ B65G 19/04; B65G 19/06; B65G 19/08; B65G 19/10; B65G 19/12; B65G 2207/48; E21F 13/066
USPC .................................................. 198/727–734
See application file for complete search history.

(56) References Cited

U.S. PATENT DOCUMENTS

| | | | | |
|---|---|---|---|---|
| 3,955,666 A * | 5/1976 | Braun | ..................... | B65G 19/24 198/850 |
| 4,429,783 A * | 2/1984 | Clement | ................ | B65G 19/24 198/731 |
| 4,573,565 A * | 3/1986 | Braun | ..................... | B65G 19/22 198/719 |
| 4,600,097 A * | 7/1986 | Temme | .................. | B65G 19/24 198/731 |
| 4,988,033 A * | 1/1991 | Hesse | ..................... | B23K 33/00 228/119 |
| 2002/0050442 A1* | 5/2002 | Malitzki | ................ | B65G 19/24 198/735.2 |
| 2014/0332354 A1* | 11/2014 | Morris | .................. | B65G 19/20 198/852 |

FOREIGN PATENT DOCUMENTS

| | | | | |
|---|---|---|---|---|
| DE | 102004038688 A1 | 2/2006 | | |
| DE | 102009055004 A1 | 7/2010 | | |
| DE | 102014112369 A1 * | 3/2016 | ............ | B65G 19/22 |
| EP | 0083119 A1 | 7/1983 | | |
| GB | 2139981 A | 11/1984 | | |
| WO | WO-2007065201 A1 * | 6/2007 | ............ | B65G 19/22 |

OTHER PUBLICATIONS

International Search Report and Written Opinion of International Application No. PCT/DE2018/100825 dated Jan. 16, 2019; 22pp.
Office Action for Russian Application No. 2020108644 dated Aug. 24, 2020; 9pp.

* cited by examiner

DRIVER FOR SCRAPER CHAIN CONVEYORS

RELATED APPLICATIONS

The present application is a National Phase of International Application Number PCT/DE2018/100825 filed Oct. 4, 2018, which claims priority to German Application Number 20 2017 107 766.7 filed Dec. 20, 2017.

FIELD

The disclosure relates to a driver for scraper chain conveyors.

BACKGROUND

A scraper chain conveyor is a conveying means in which the conveyed material is moved by drivers of a chain belt in a trough line formed from conveying troughs. The drivers, also known as scrapers, are fastened to the conveyor chains. The drivers establish engagement with the conveyed material and move the latter at conveying speeds in the conveying direction. Depending on the number and position of the chain lines, single-chain conveyors, twin inboard chain conveyors, twin outboard chain conveyors and three-chain conveyors are differentiated.

For functional and operational reasons, the drivers of a scraper chain conveyor are subject to a high level of wear.

DE 10 2004 038 688 A1 discloses a driver for face conveyors, in which the ends that engage in the guides of the conveying troughs or of the trough line have a coating made of a wear-resistant material. As a result, the wear on the underside of the driver ends is intended to be reduced when the driver is moved in the lower strand and bears with its ends on the lateral guide.

SUMMARY

Proceeding from the prior art, the disclosure is based on the object of creating a driver for scraper chain conveyors that is improved in terms of parts and for operational use, in regard to wear resistance and service life.

According to the disclosure, this object is achieved by a driver for scraper chain conveyors.

A driver for scraper chain conveyors has a central portion having a chain link receptacle for attaching the driver to chain links of a conveyor chain. Scraper wings adjoin both sides of the central portion of the driver. Each scraper wing has, starting from the central portion, a web portion and an end portion that is widened with respect to the web portion.

According to the disclosure, on the underside of the web portion, a wear plate is provided, which covers the web portion in the direction of the end portion starting from a step on the underside of the central portion.

This measure helps to considerably improve the service life of a driver, specifically both as far as the abrasion resistance and wear resistance is concerned and the behavior when the driver slides in the conveying trough. This results in positive effects on the conveyor performance.

In one configuration of the wear plate, the latter has a rectangularly configured base portion having ends that are widened in the direction of the end portions of the scraper wings with respect to the base portion. As a result, the underside of the driver is effectively protected from wear at both scraper wings and the sliding behavior in the conveying troughs is further improved.

In a further advantageous aspect, the wear plate extends as far as the end portion of the scraper wing and at least regionally covers the end portion. This measure, too, effectively improves the wear resistance of the driver.

In a further advantageous embodiment of a driver according to the disclosure, each scraper wing has a scraper tip, wherein the scraper tip is at least regionally covered by the wear plate.

Furthermore, a wear body can likewise be provided on the top side of the end portion of a scraper wing.

The wear body can be embodied as a separate part from the wear plate. In this case, the wear body is joined to the top side of the end portion in a materially bonded manner.

It is also possible for the wear plate and the wear body to be embodied in one piece from the same material. The wear body is then a constituent of the wear plate. The latter covers the underside of the scraper wing and extends around the scraper tip as far as the top side of the end portion.

The wear bodies on the top side of the end portion protect the region that comes into contact on the top side with the guides of the conveying troughs. In addition, the drivers bear on the wear bodies in the lower strand.

The drivers, or the main bodies of the drivers, include chain steel or of a quenched and tempered steel, for example 42CrMo4.

In the scope of the disclosure, both wear plates and wear bodies that include a wear- and abrasion-resistant steel having a Brinell hardness of greater than or equal to ($\geq$) 400 HB are considered to be advantageous and suitable, wherein, the Brinell hardness is in a range between 400 HB and 600 HB.

In a further aspect of the disclosure, in each scraper wing, a cavity is provided that extends in the longitudinal direction thereof. The cavity is covered on its underside by the wear plate.

This configuration results in a weight reduction of the driver and thus of the conveyor device as a whole. Given the large number of drivers, a significant weight reduction is possible, such that, if appropriate, the installed drive power can be lowered.

It is possible for the cavity to be filled with a filling material that is lighter than the material of the driver, for example a porous or foamed material, or a fiber material.

The wear plates are joined to the drivers in a materially bonded manner, e.g., welded thereto. In this case, a wear plate can be joined all the way round or only regionally to the underside of a driver.

In an advantageous configuration, the wear plate has protrusions that protrude at the end on the central portion side and/or on the end portion side. The protrusions act as form-fitting elements and additionally contribute toward stable fastening of the wear plate to the underside of the scraper wing. This, too, increases the performance of the driver.

In an embodiment of the driver that is advantageous in practice, the wear plate has a length L1 and a scraper wing has a length L2. In this case, the ratio L1:L2 of the length L1 of the wear plate to the length L2 of the scraper wing is between 20% and 100% or between 50% and 100% or between 65% and 90%.

It is also advantageous when the wear plate has a height H1 and a scraper wing has, at its highest point, a height H2, wherein the ratio H1:H2 of the height H1 of the wear plate to the height H2 of the scraper wing is between 6% and 35% or between 8% and 35% or between 10% and 20%.

The wear plate has a width B1 and a scraper wing has a width B2. The ratio B1:B2 of the width B1 of the wear plate to the width B2 of the scraper wing is between 50% and 200% or between 60% and 120%.

The above geometric design rules for the length of the wear plate and of the scraper wings and with regard to the height thereof allow a design of the driver that is advantageous in terms of parts. An advantageous correlation of the dimensions of the width of a wear plate to the width of a scraper wing contributes thereto.

BRIEF DESCRIPTION OF THE DRAWINGS

The disclosure is described in more detail in the following text by way of exemplary embodiments. In the figures.

DETAILED DESCRIPTION

Figure 1:
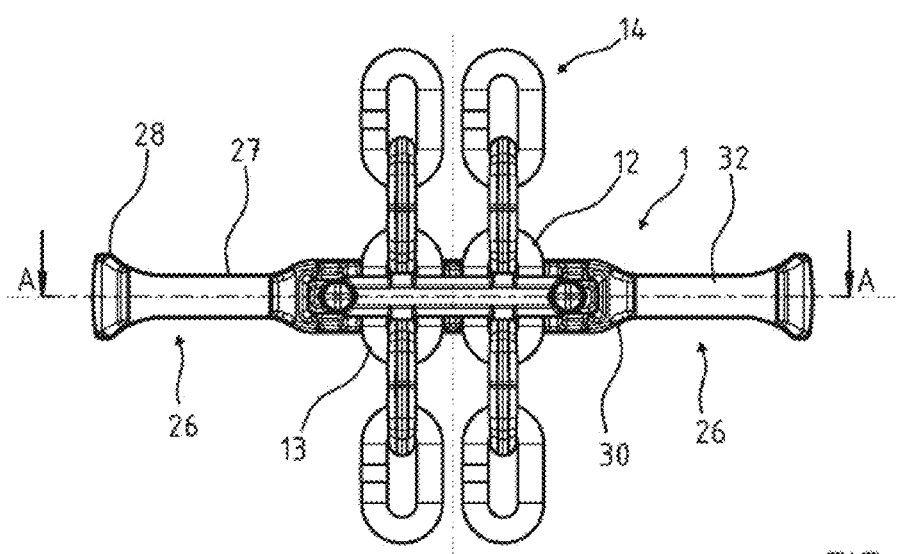
FIGS. 1 to 7 show a driver according to at least one embodiment, fastened to a conveyor chain, in a view from below, a frontal view, a longitudinal section, a view from above, a perspective view, a side view and in an exploded illustration.
Figure 2:
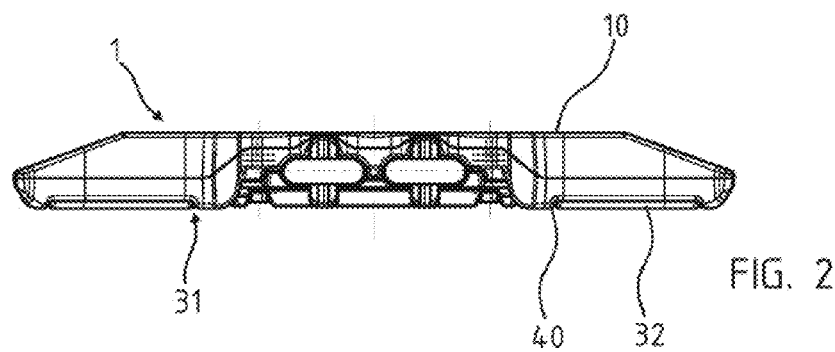
Figure 3:
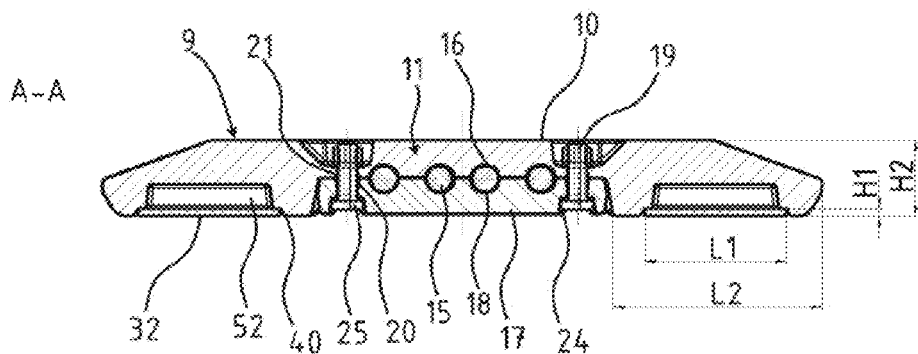
Figure 4:
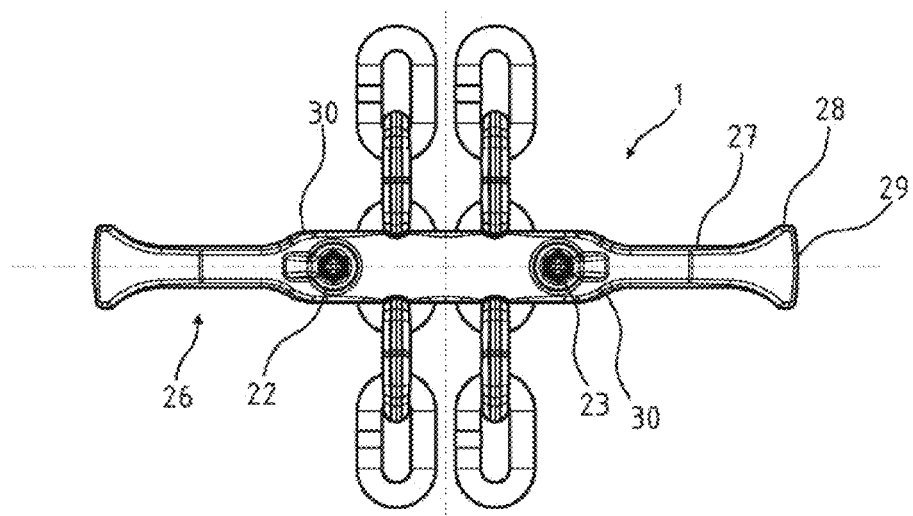
Figure 5:
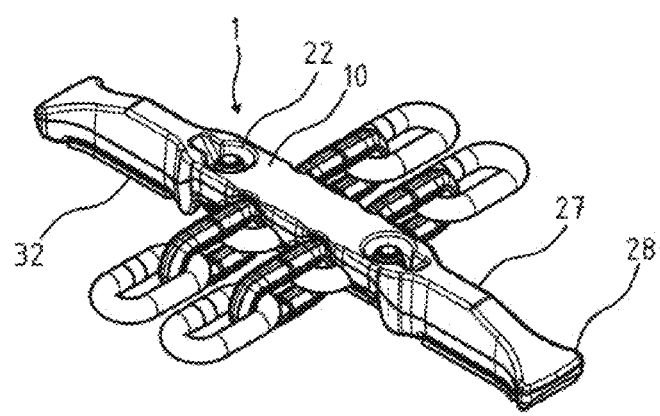
Figure 6:
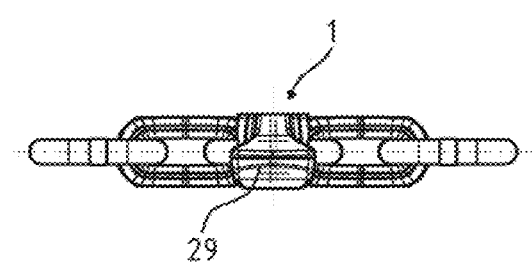
Figure 7:
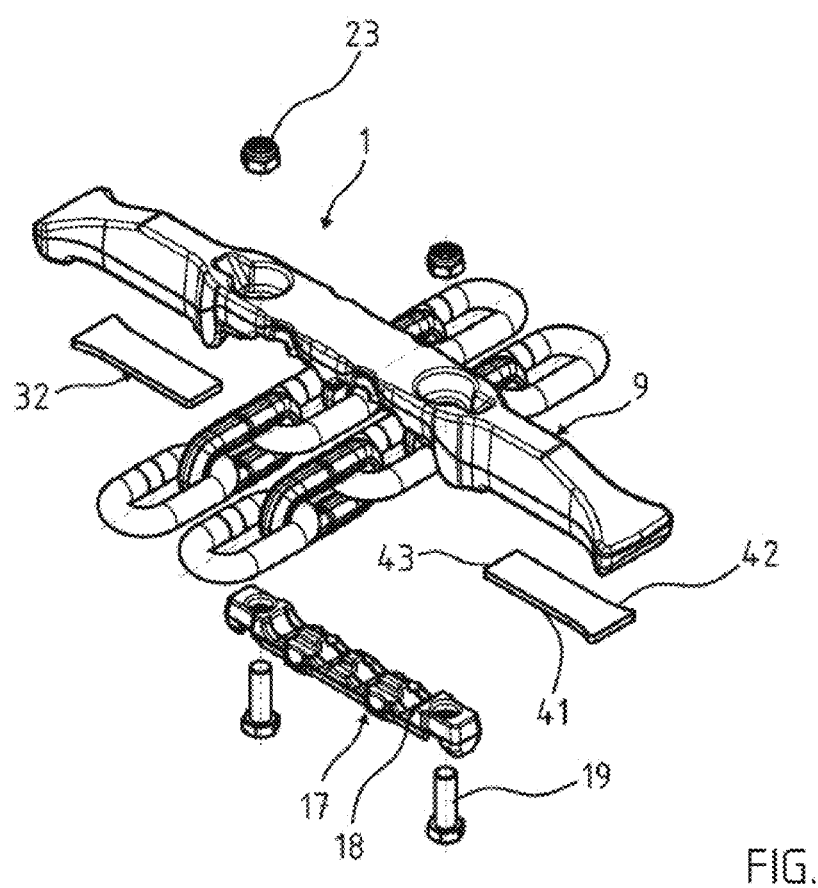
Figure 8:
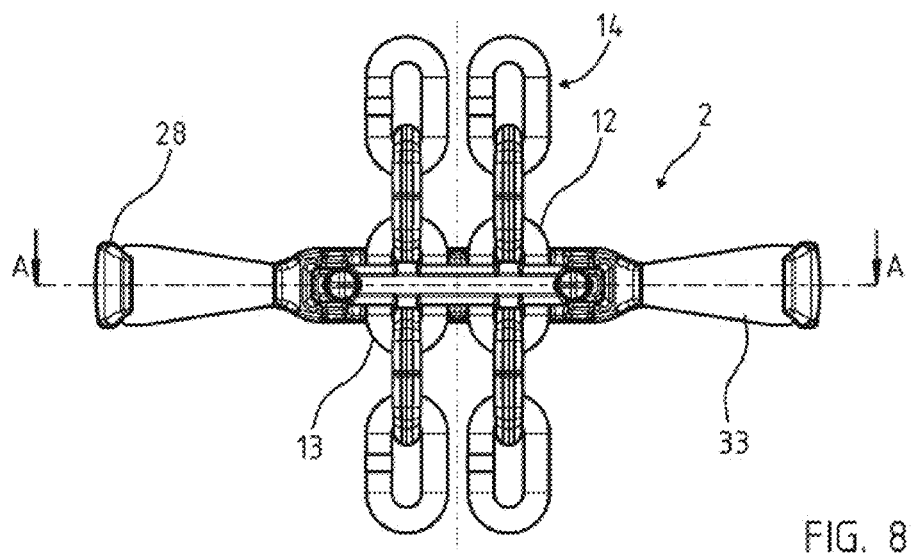
FIGS. 8 to 14 show corresponding views of a second embodiment of a driver according to at least one embodiment.
Figure 9:
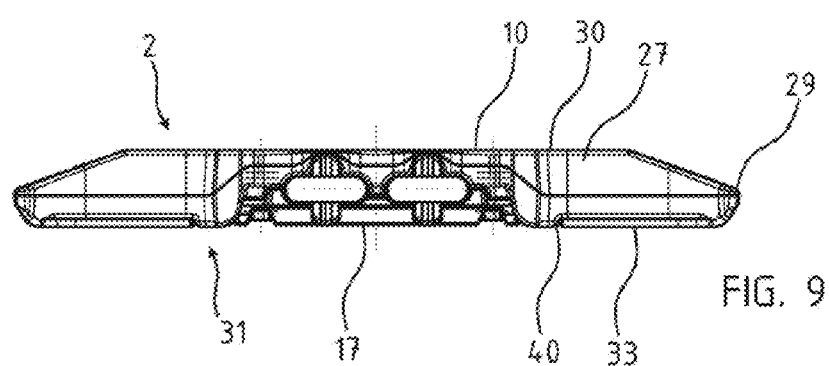
Figure 10:
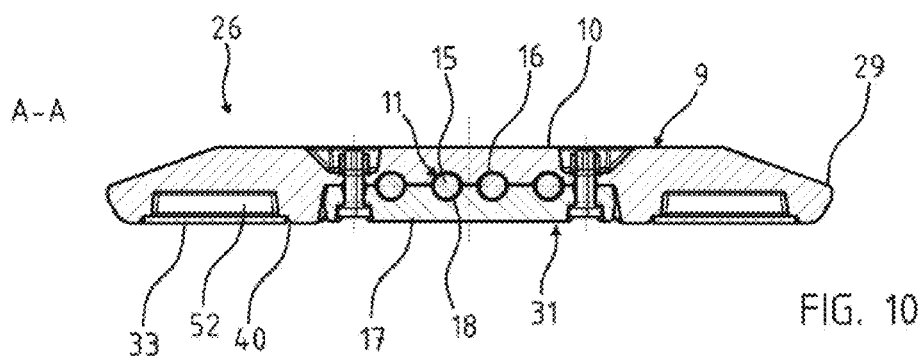
Figure 11:
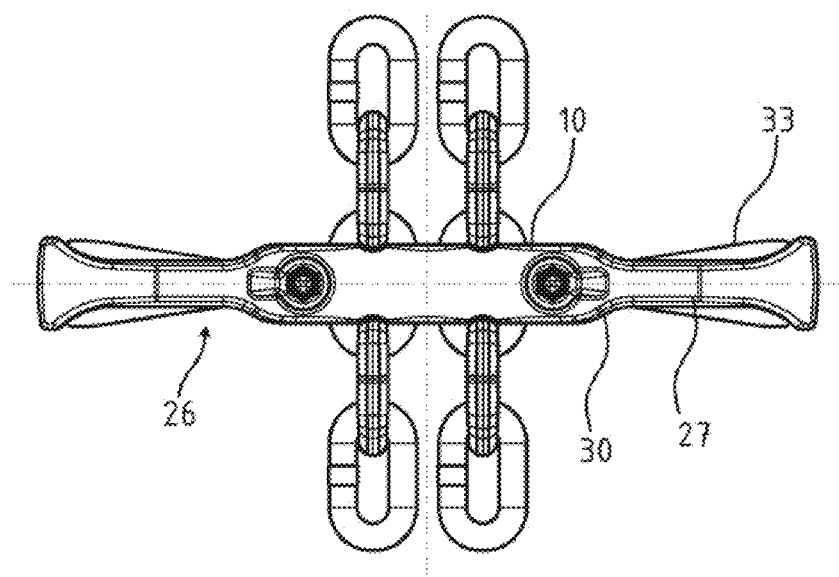
Figure 12:
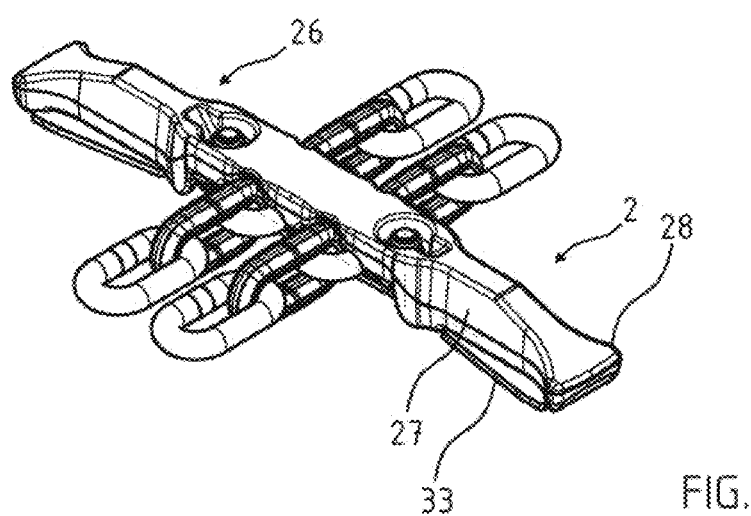
Figure 13:
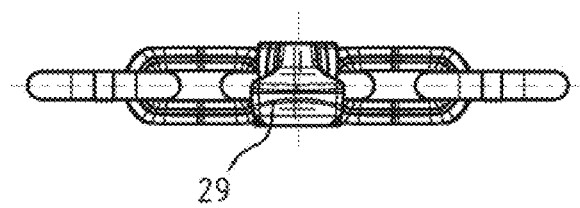
Figure 14:
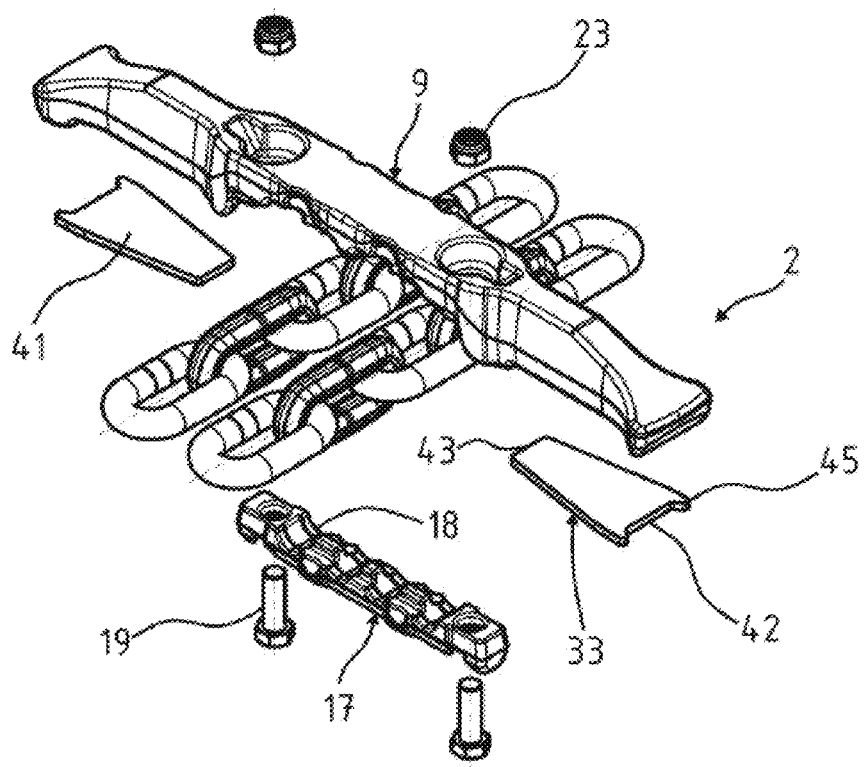
Figure 15:
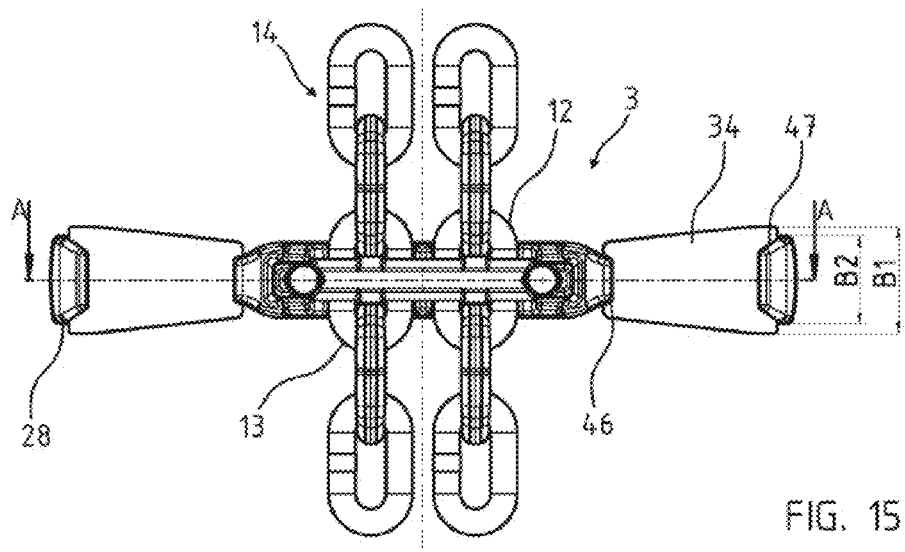
FIGS. 15 to 21 show corresponding views of a third embodiment of a driver according to at least one embodiment.
Figure 16:
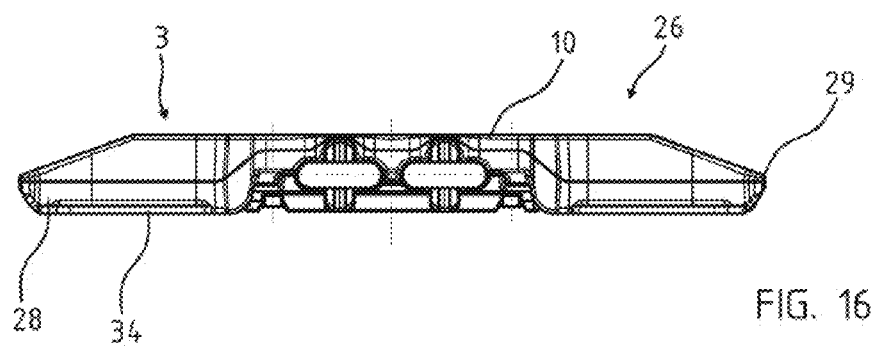
Figure 17:
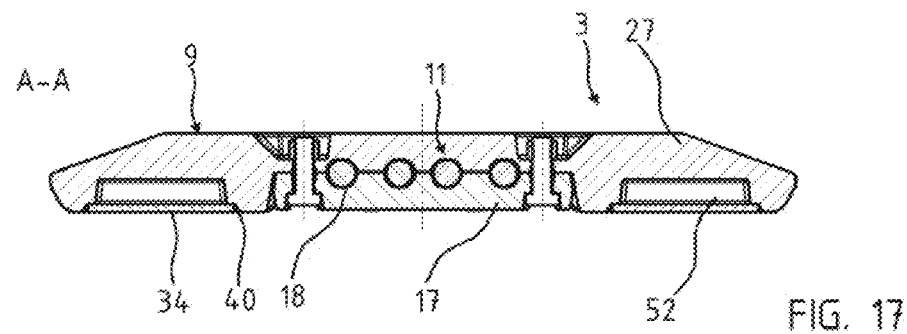
Figure 18:
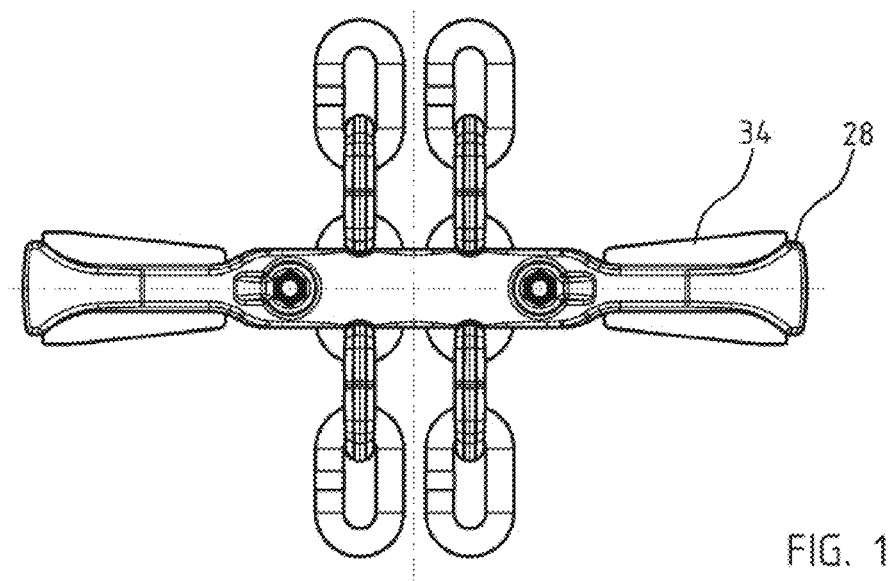
Figure 19:
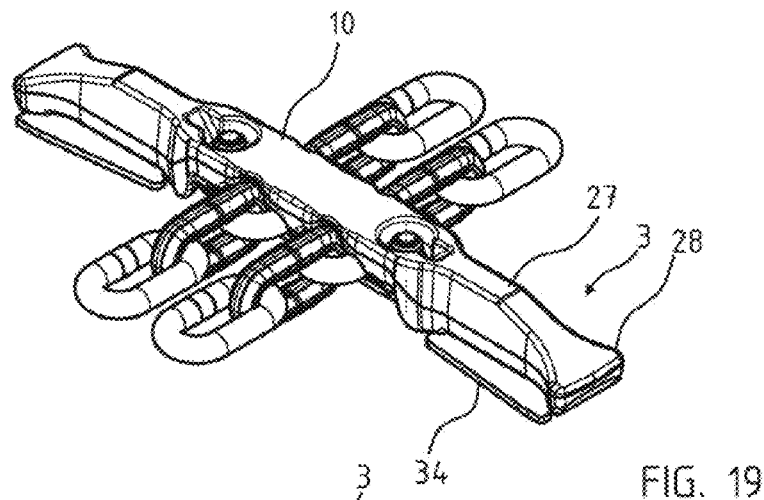
Figure 20:
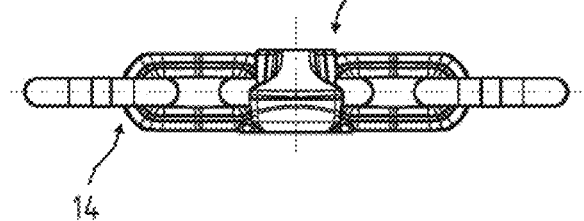
Figure 21:
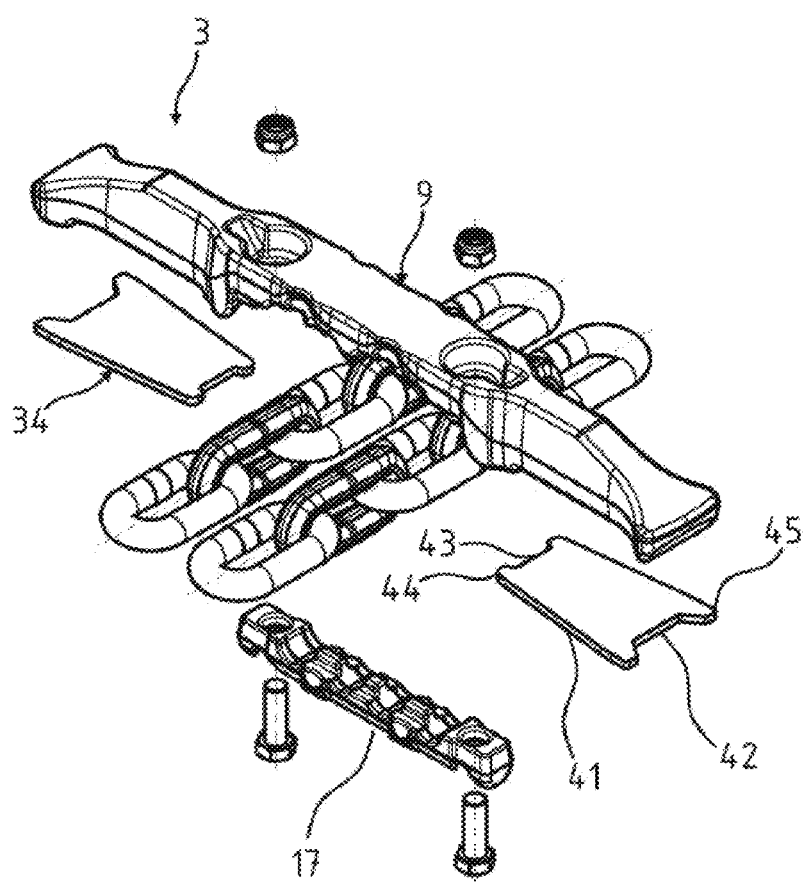
Figure 22:
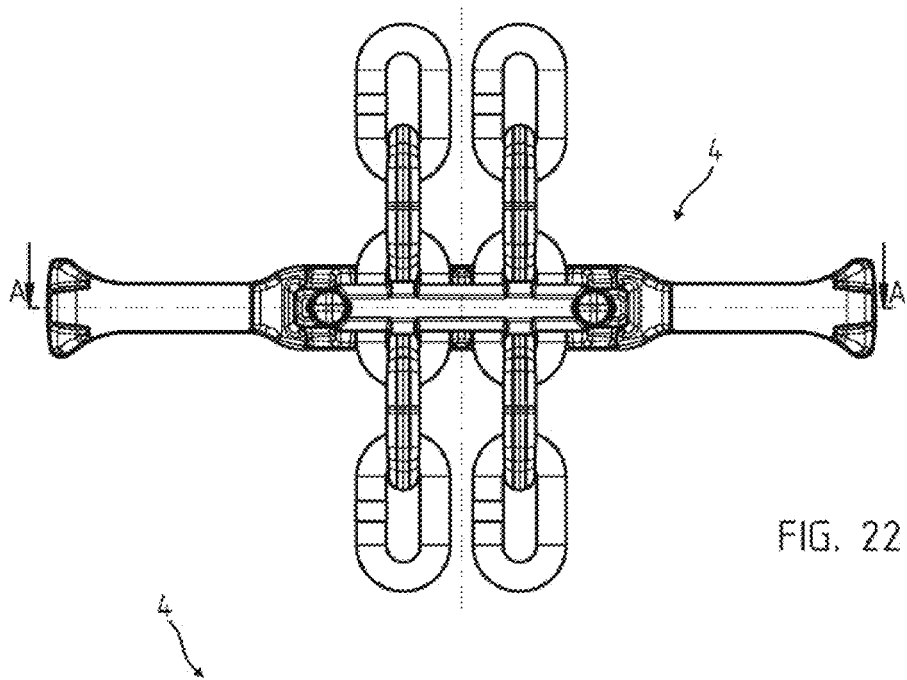
FIGS. 22 to 28 show corresponding views of a fourth embodiment of a driver according to at least one embodiment.
Figure 23:
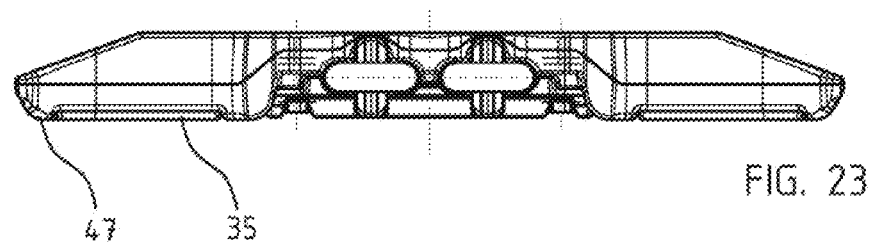
Figure 24:
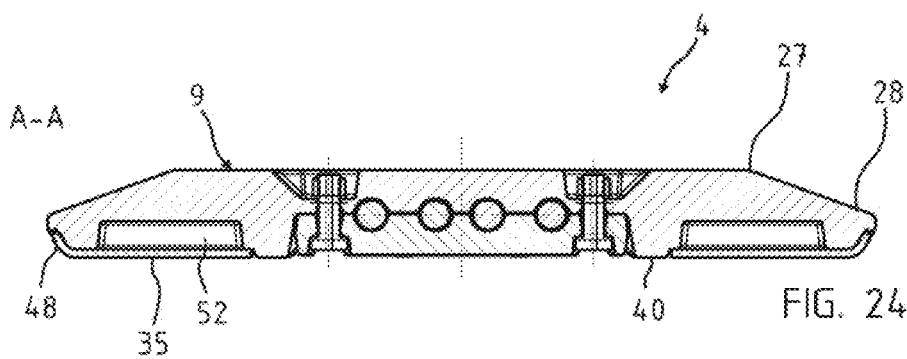
Figure 25:
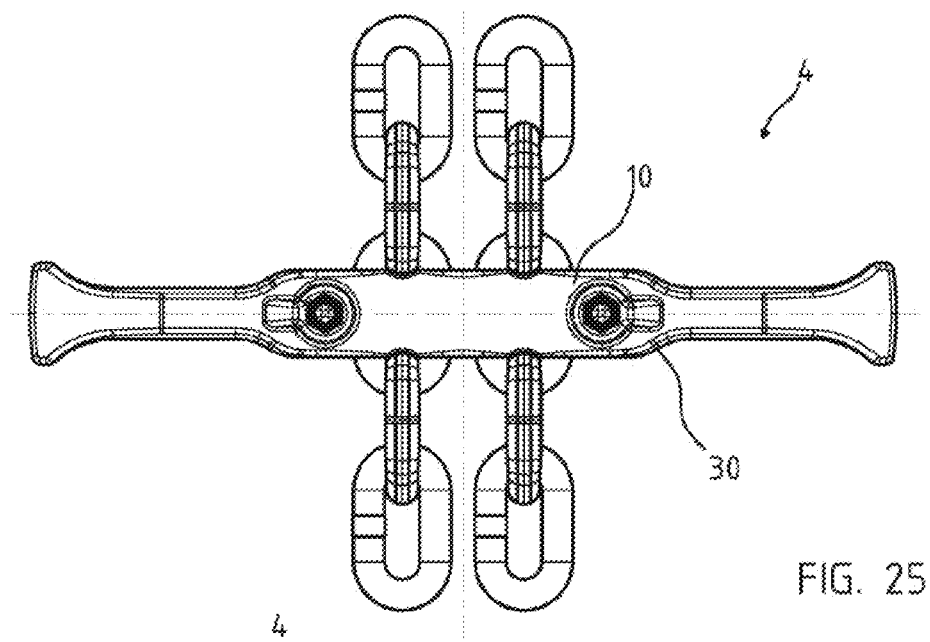
Figure 26:
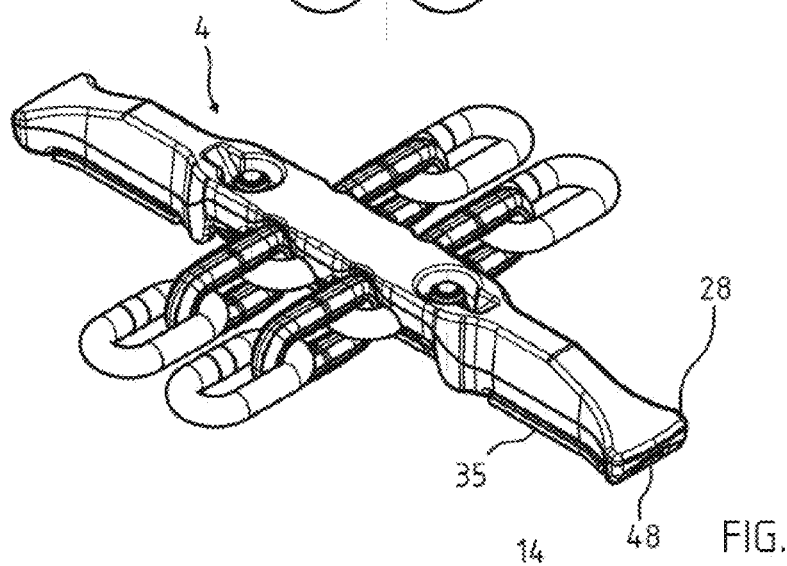
Figure 27:
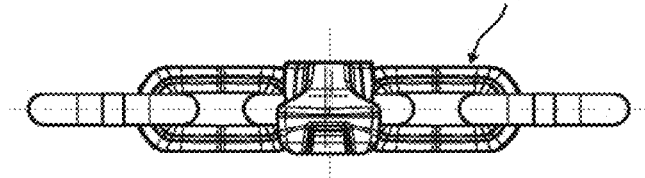
Figure 28:
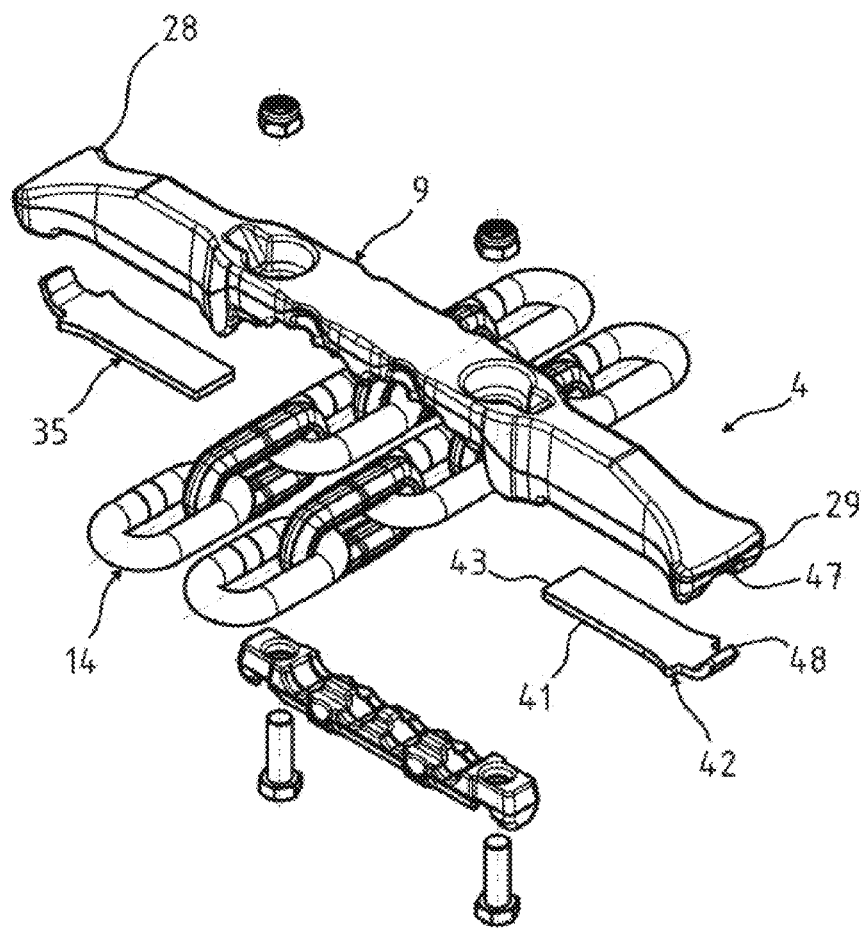
Figure 29:
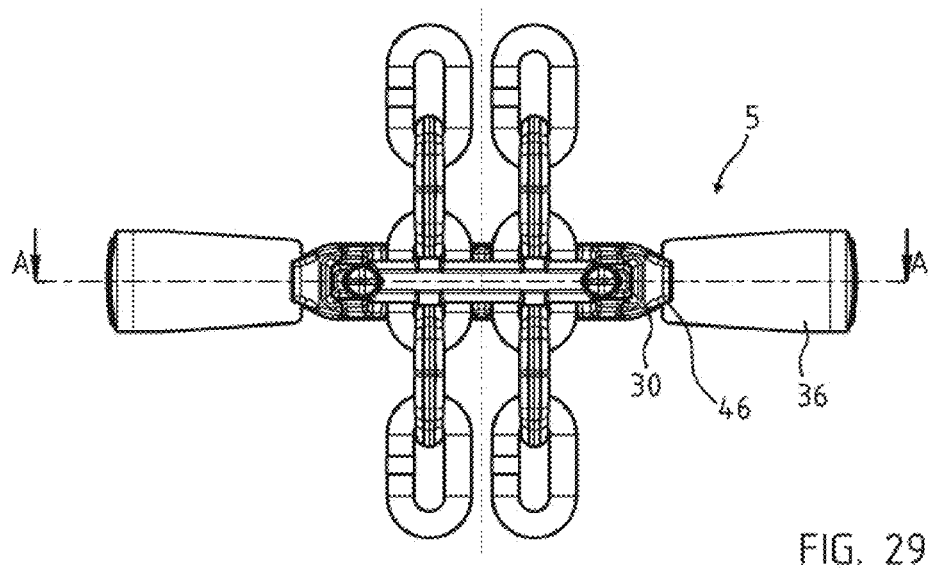
FIGS. 29 to 35 show corresponding views of a fifth embodiment of a driver according to at least one embodiment.
Figure 30:
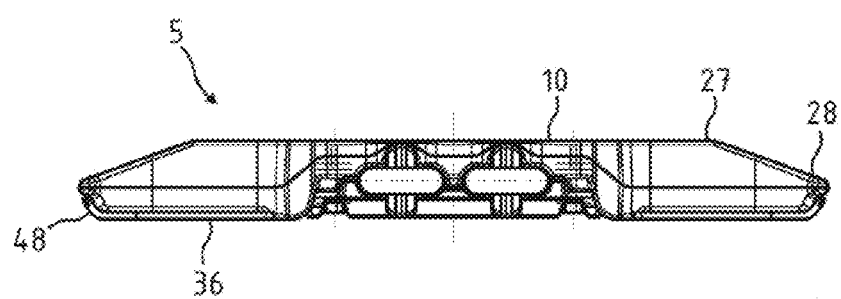
Figure 31:
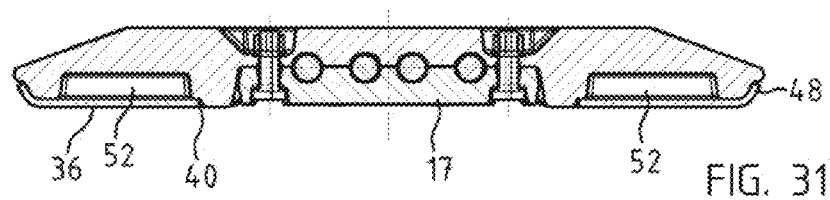
Figure 32:
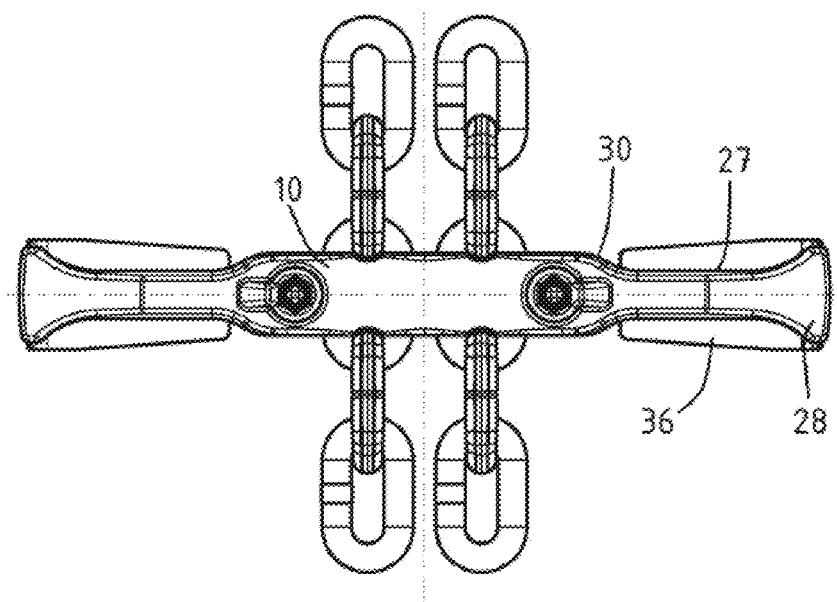
Figure 33:
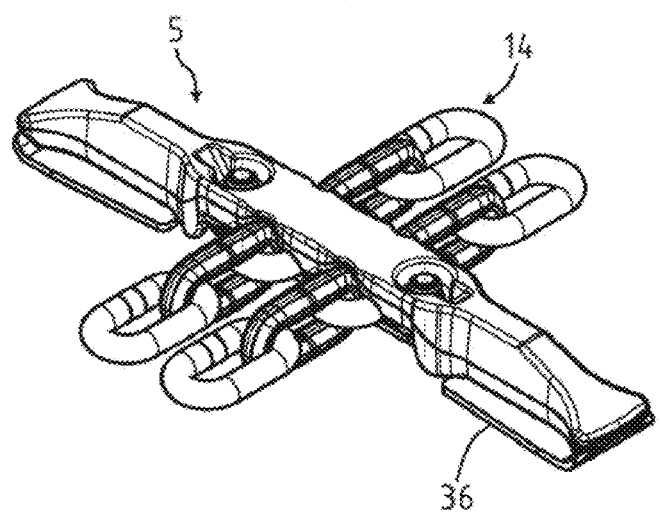
Figure 34:
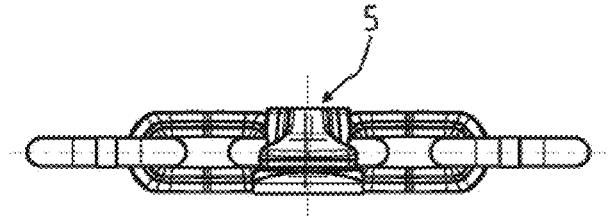
Figure 35:
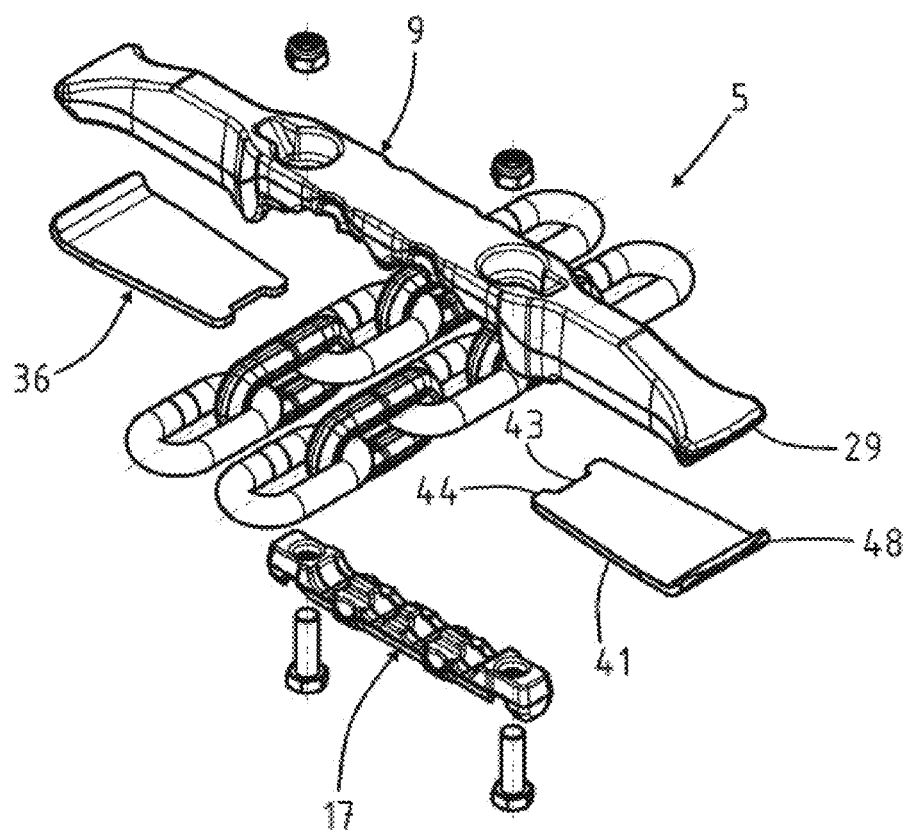
Figure 36:
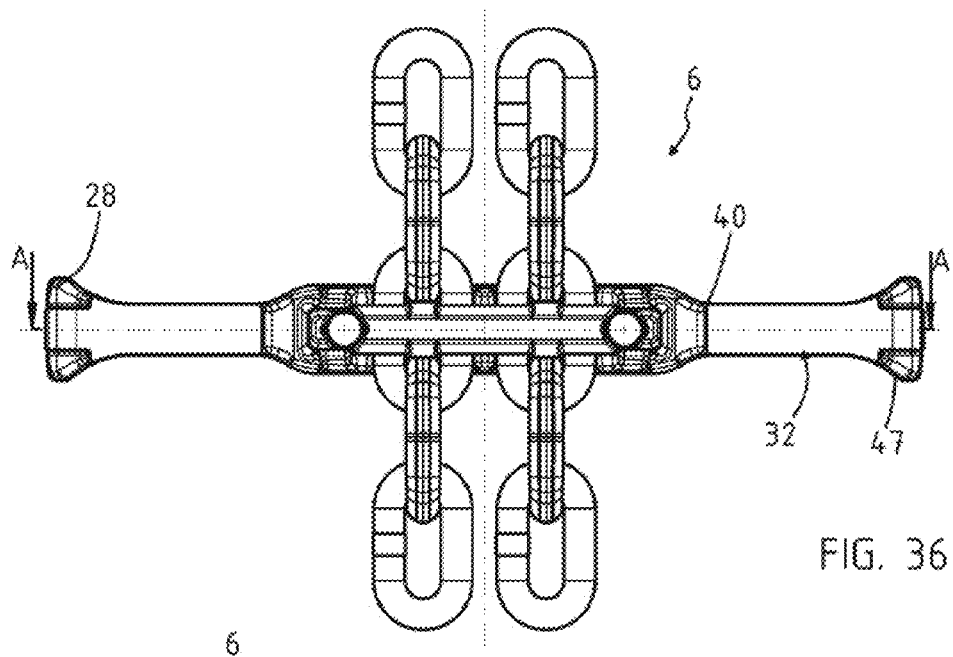
FIGS. 36 to 42 show corresponding views of a sixth embodiment of a driver according to at least one embodiment.
Figure 37:
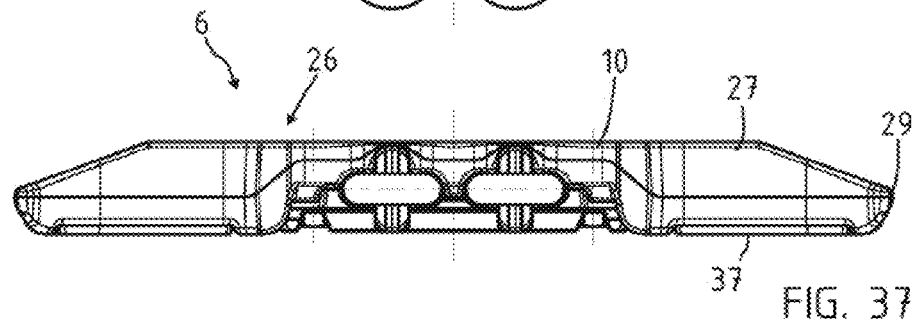
Figure 38:
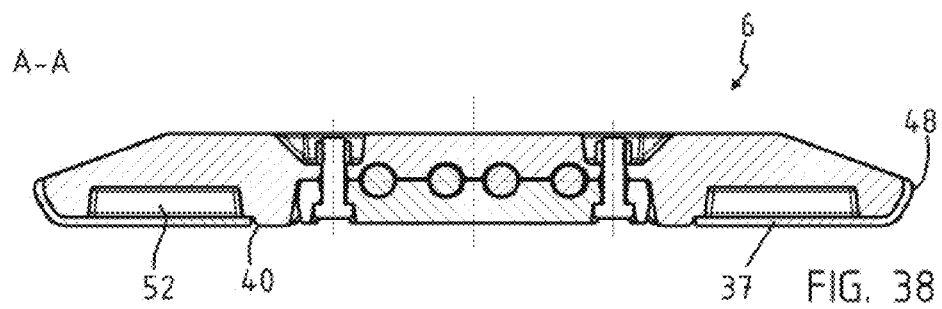
Figure 39:
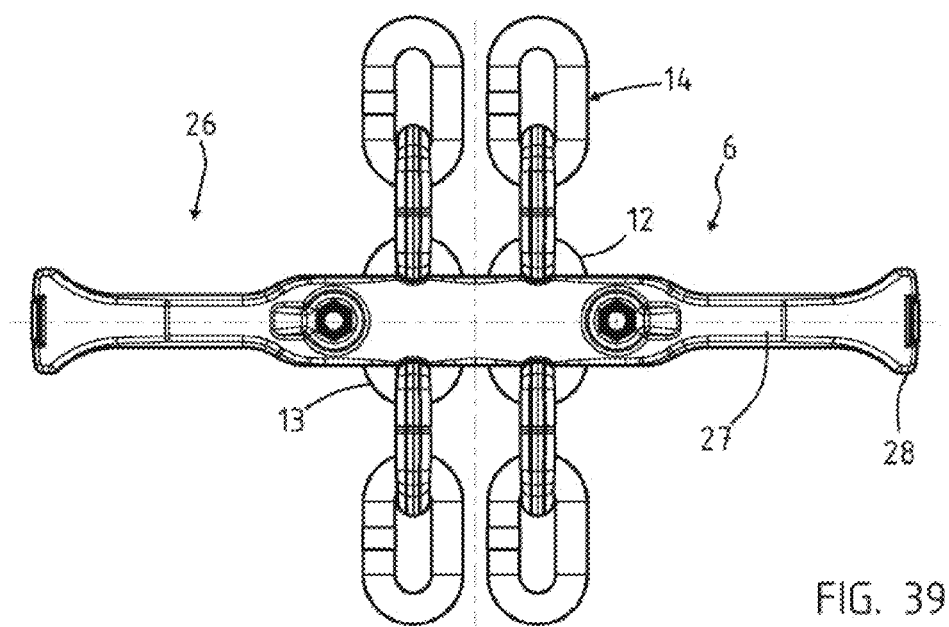
Figure 40:
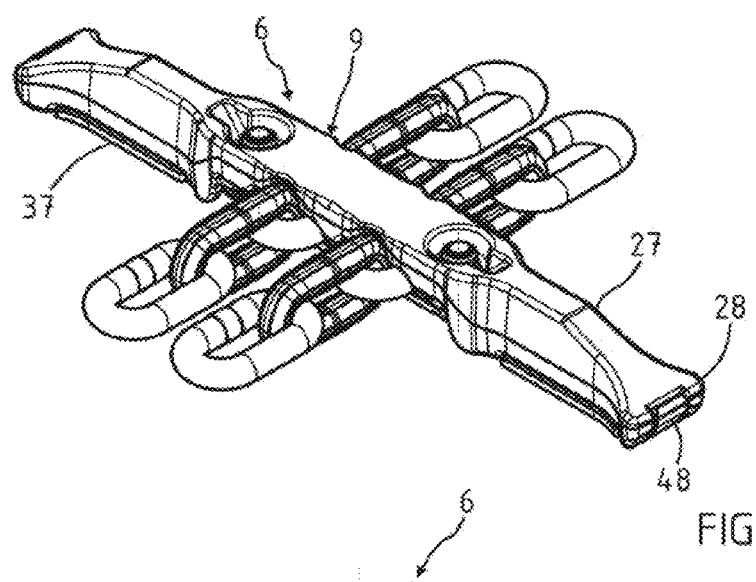
Figure 41:
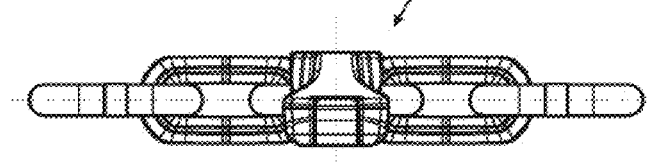
Figure 42:
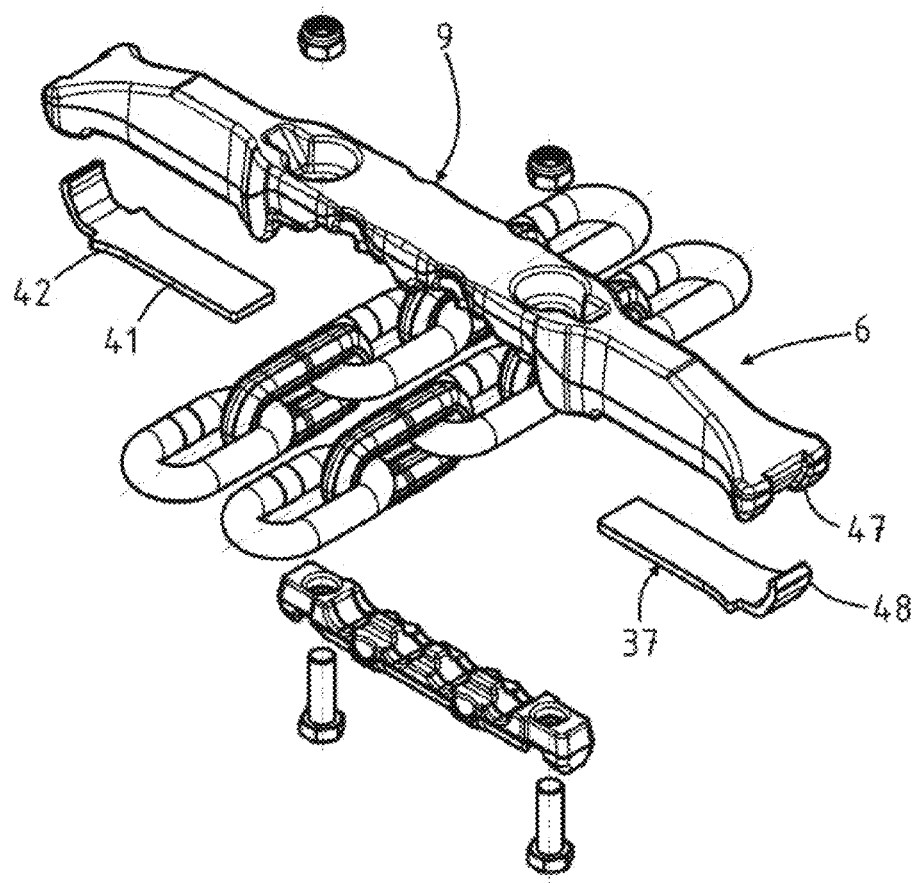
Figure 43:
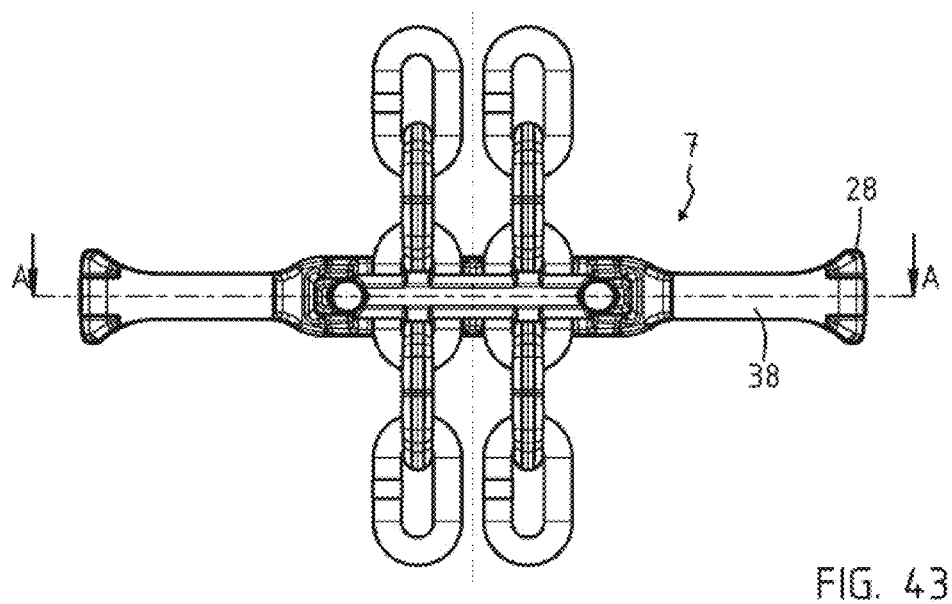
FIGS. 43 to 49 show corresponding views of a seventh embodiment of a driver according to at least one embodiment.
Figure 44:
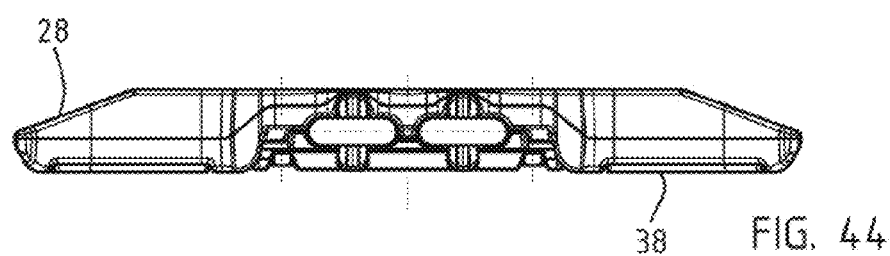
Figure 45:
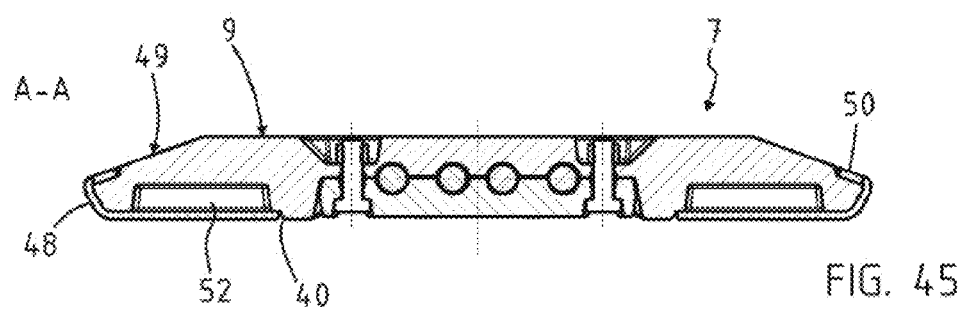
Figure 46:
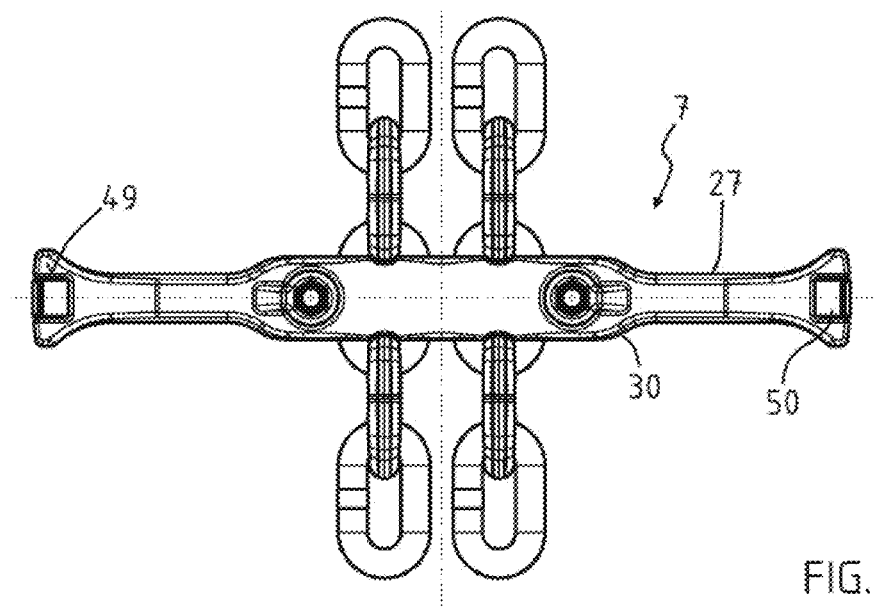
Figure 47:
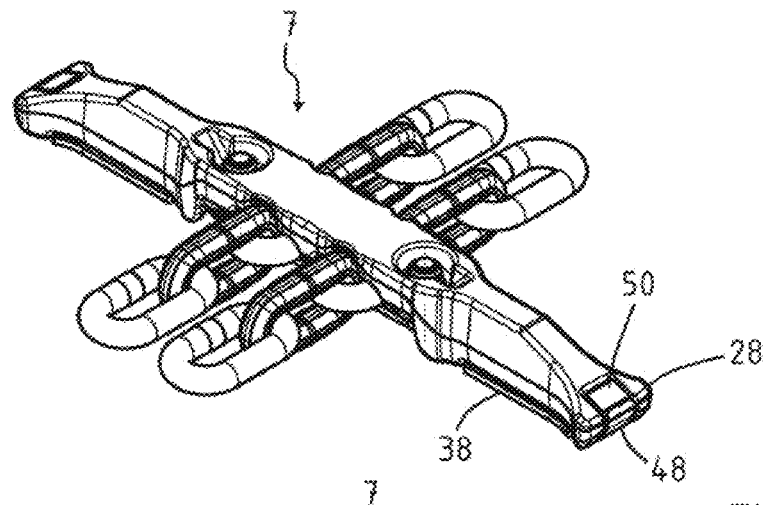
Figure 48:
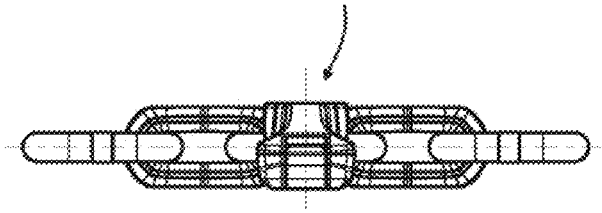
Figure 49:
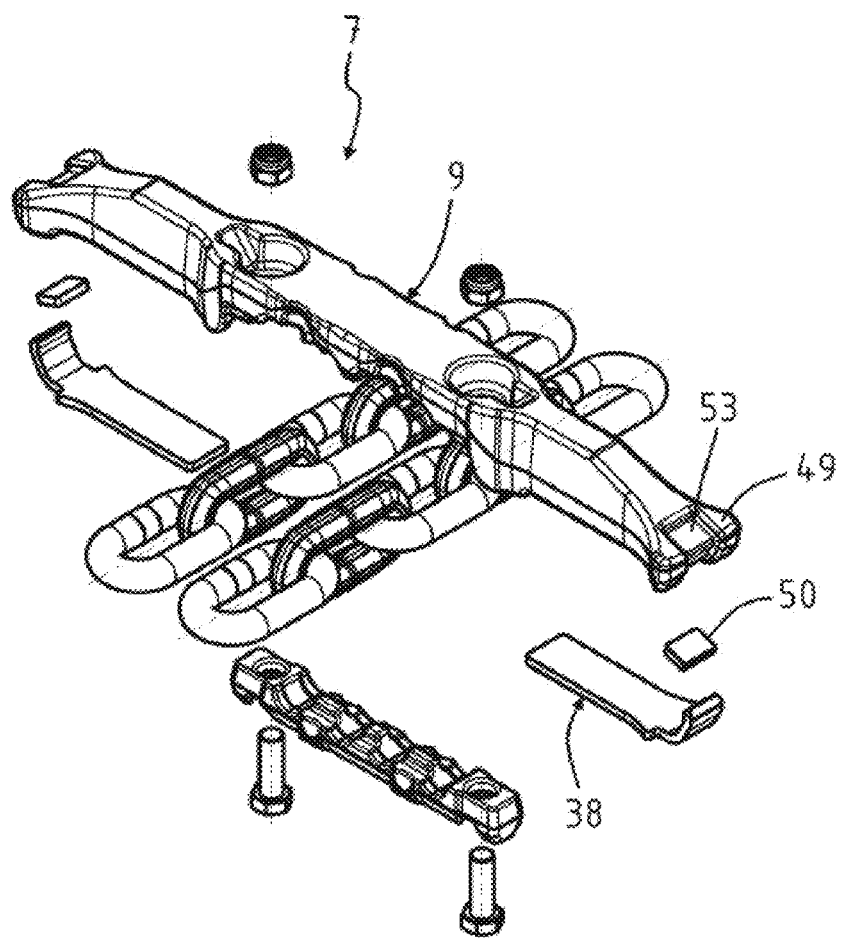
Figure 50:
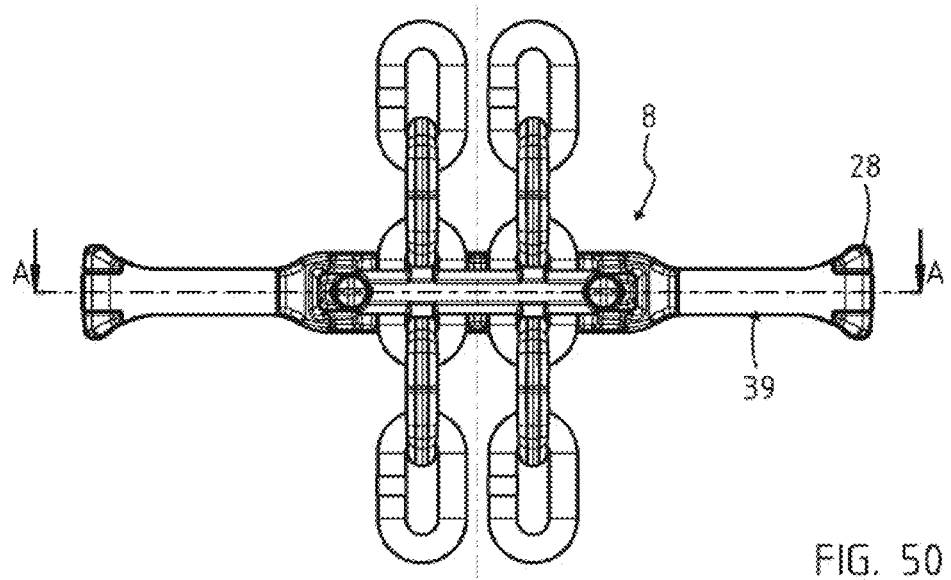
FIGS. 50 to 56 show corresponding views of an eighth embodiment of a driver according to at least one embodiment.
Figure 51:
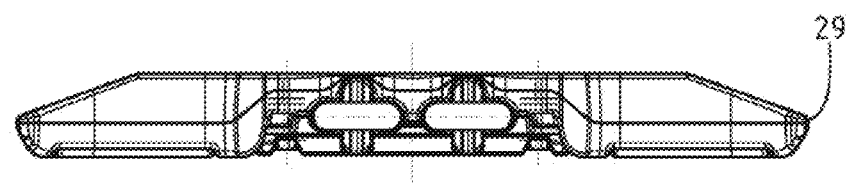
Figure 52:
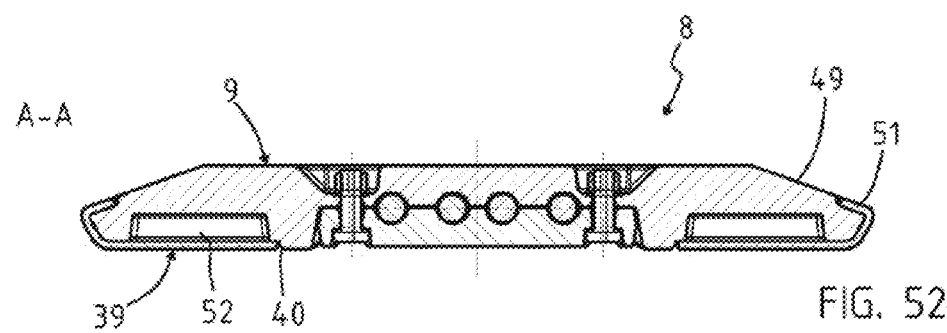
Figure 53:
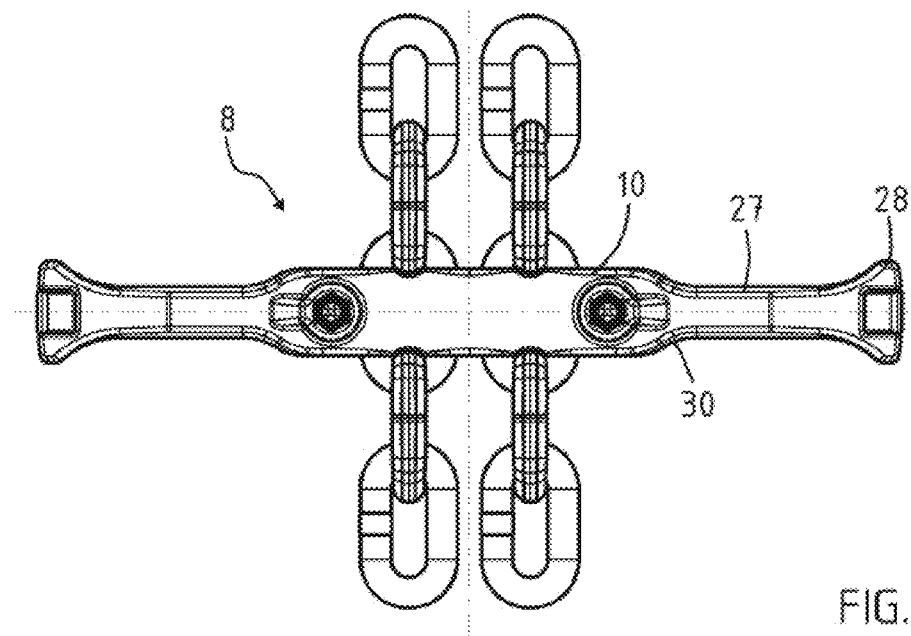
Figure 54:
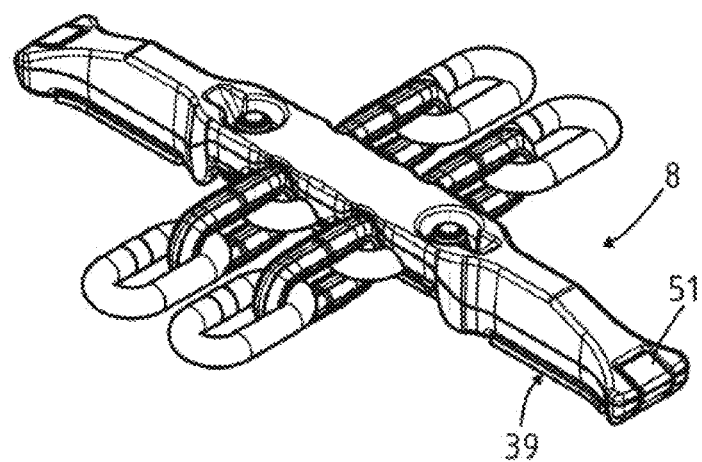
Figure 55:
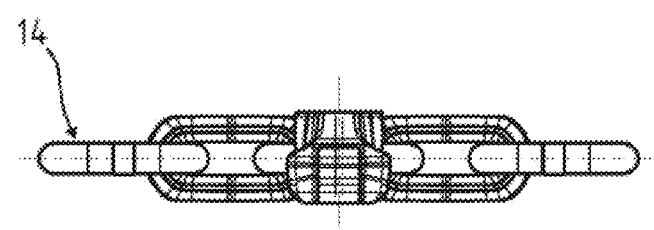
Figure 56:
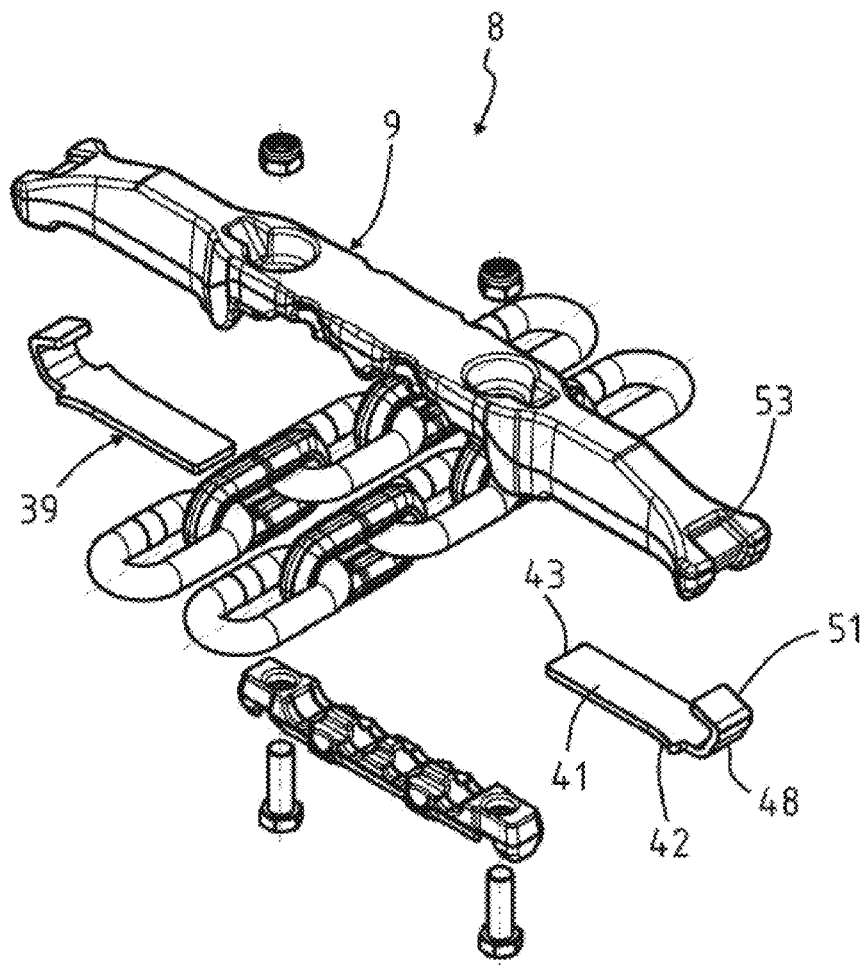

With reference to FIGS. 1 to 7, 8 to 14, 15 to 21, 22 to 28, 29 to 35, 36 to 42, 43 to 49, and 50 to 56, respective embodiments of a driver 1, 2, 3, 4, 5, 6, 7, 8 according to the disclosure are explained. The drivers 1-8 correspond to one another in terms of their basic structure. Accordingly, identical parts or components are provided with the same reference signs.

The drivers 1-8 are designed in a mirror-symmetric manner with respect to their longitudinal center axis and their transverse center axis. Each driver 1-8 has a metal main body 9. The latter includes a chain steel or of a quenched and tempered steel, for example 42CrMo4. The driver 1-8, or the main body 9 thereof, has a central portion 10 having a chain link receptacle 11 for attaching the driver 1-8 to chain links 12, 13 of a conveyor chain 14.

The chain receptacle 11 comprises semicircular recesses 16 adapted to legs 15 of the chain links 12, 13. The legs 15 of the chain links 12, 13 fit therein. Provided on the underside is a releasable closure part 17. The closure part 17 has recesses 18 that are formed in a complementary manner to the legs 15 of the chain links 12, 13 and engages around these from below. By means of bolts 19, the closure part 17 is connected to the main body 9 of the driver 1-8. The bolts 19 pass through corresponding bores 20, 21 in the closure part 17 and in the central portion 10 of the driver 1-8. On the top side in the central portion 10, receptacles 22 for threaded nuts 23 are provided. On the underside of the closure part 17, depressions 24 are provided, into each of which a bolt 19 engages with its bolt head 25.

The central portion 10 is adjoined on both sides, in each case toward the outside, by a scraper wing 26. Each scraper wing 26 has a web portion 27 and an end portion 28 that is widened with respect to the web portion 27 and has an outer scraper tip 29. The central portion 10 is wider than the web portion 27 and transitions into the web portion 27 via a narrowing transition portion 30. The transition portion 30 belongs to the central portion 10 of the driver 1 to 8.

On the underside 31 of the web portion 27 of each scraper wing 26, a wear plate 32-39 is provided in each case. The wear plate 32-39 extends from a step 40 on the underside 31 of the central portion 10 and covers the web portion 27 in the direction of the end portion 28.

The wear plate 32-39 includes a wear- and abrasion-resistant steel having a Brinell hardness of greater than or equal to (≥) 400 HB to 600 HB.

A wear plate 32-39 has a length L1 and a scraper wing 26 a length L2. Furthermore, a wear plate 32-39 has a height H1 and a scraper wing 26, at its highest point, a height H2. The length L1 and the height H1 of the wear plate 32-39 and the length L2 and the height H2 of the scraper wing 26 are indicated by way of example in FIG. 3.

Furthermore, a wear plate 32-39 has a width B1 and a scraper wing 26 a width B2. The width B1 of the wear plate 32-39 and the width B2 of the scraper wing 26 are indicated by way of example in FIG. 15.

An advantage for the design of the drivers 1-8 is when the ratio L1:L2 of the length L1 of the wear plate 32-39 to the length L2 of the scraper wing 26 is between 20% and 100% or between 50% and 100% or between 65% and 90%. It is furthermore advantageous when the ratio H1:H2 of the height H1 of the wear plate 32-39 to the height H2 of the scraper wing is between 6% and 35% or between 8% and 35% or between 10% and 20%. The ratio B1:B2 of the width B1 of the wear plate 32-39 to the width B2 of the scraper wing 26 is in practice between 50% and 200% or between 60% and 120%.

The drivers 1-8 differ mainly in the design and configuration of the wear plates 32-39.

The wear plate 32-39 has a base portion 41 and an end 42 that is widened with respect to the base portion 41.

In the case of the wear plate 32, 35, 37, 38 and 39, the base portion 41 is configured in a rectangular manner. The widening end 42 is trapezoidal in design.

In the case of the wear plate 33, 35, 35, the base portion 41 enlarges uniformly toward the end 42 on the end portion side.

In the case of the drivers 2, 3 and 5, the wear plate 33, 34, 36 is wider than the web portion 27 of a scraper wing 26. The wear plate 33, 34, 36 is also wider than the end portion 28 of the driver 2, 3, 5 and accordingly protrudes laterally with respect to the web portion 27 and the end portion 28.

The wear plates 36 of the driver 1-8 have protrusions 44 that protrude at the end 43 on the inner central portion side.

The wear plates 32 of the driver 7 have protrusions 45 that protrude at the end 42 on the outer end portion side.

The wear plate 34 of the driver 3 has protrusions 44, 45 that protrude both at the end 43 on the central portion side and at the end 42 on the end portion side.

By way of the protrusions 44, 45, the wear plates 33, 34, 36 engage around abutment faces 46, 47 on the drivers 2, 3, 5, or on the central portion 10 or on the end portion 28.

In the case of the wear plate 35-39 of the driver 4-8, as can be seen in the associated figures, an end portion 48 of the wear plate 35-39 is bent upward and regionally engages around the scraper tip 29.

In the case of the driver 7, as illustrated in FIGS. 43-49, a wear body 50 is provided on the top side 49 of the end portion 28 of a scraper wing 26. The wear body 50 is joined, as a separate component, in a materially bonded manner to the top side of the driver 7 on the top side 49 of the end portion 28 in a receptacle 53.

In the case of the driver 8, as illustrated in FIGS. 50-56, the wear plate 39 and a top-side wear body 51 are formed in one piece from the same material. The wear plate 39 is guided with its end-side wear body 51 around the scraper tip 29 as far as the top side 49 of the end portion 28 on the scraper wing 26. The top-side wear body 51 also fits in a recessed receptacle 53 in the top side 49 of the end portion 28.

The wear body 50, too, is made of a wear- and abrasion-resistant steel having a Brinell hardness of greater than or equal to (≥) 400 HB, with a Brinell hardness of 400 HB to 600 HB.

Each driver 1-8 has on its underside in the scraper wings 26 a cavity 52 that extends in the longitudinal direction of the scraper wing 26. The cavity 52 is covered by the wear plates 32-39.

The wear plates 32-39 bear on the step 40 with their end 43 on the central portion side. At the end 42 on the end portion side, the wear plates 32-39 engage with abutment faces 47 on the underside of the end portion 28.

The wear plates 32-39 are welded on the underside to the drivers 1-8. This can take place all the way round or locally. The wear plates 32-39 end flush with the underside 31 of the drivers 1-8.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A driver for scraper chain conveyors, comprising:
a central portion having a chain link receptacle for attaching the driver to chain links of a conveyor chain; and
scraper wings adjoining opposite sides of the central portion,
wherein each of the scraper wings has a web portion and an end portion that is widened with respect to the web portion,
wherein each of the scraper wings comprises, on a underside of the web portion, a wear plate which covers the web portion in a direction of the end portion starting from a step on a underside of the central portion, and wherein each of the scraper wings comprises a cavity on the underside of the web portion that extends in a longitudinal direction of the scraper wing, and the cavity is covered by the wear plate.

2. The driver according to claim 1, wherein the wear plate has a base portion and an end that is widened with respect to the base portion.

3. The driver according to claim 1, wherein the wear plate extends as far as the end portion of the scraper wing and at least regionally covers the end portion.

4. The driver according to claim 1, wherein each of the scraper wings has a scraper tip, and the scraper tip is at least regionally covered by the wear plate.

5. The driver according to claim 1, wherein each of the scraper wings comprises a wear body on a top side of the end portion of the scraper wing.

6. The driver according to claim 5, wherein the wear plate and the wear body comprise one piece from the same material.

7. The driver according to claim 5, wherein at least one of the wear plate or the wear body includes a wear- and abrasion-resistant steel having a Brinell hardness ("HB") of greater than or equal to 400 HB.

8. The driver according to claim 1, wherein the wear plate has protrusions that protrude from at least one of
an end of the wear plate on a side of the central portion, or
an end of the wear plate on a side of the end portion.

9. The driver according to claim 1, wherein a ratio of a length of the wear plate to a length of the scraper wing is between 20%-100%.

10. The driver according to claim 1, wherein a ratio of a height of the wear plate to a height of the scraper wing is between 6%-35%.

11. The driver according to claim 1, wherein a ratio of a width of the wear plate to a width of the scraper wing is between 50%-200%.

12. The driver according to claim 5, wherein at least one of the wear plate or the wear body includes a wear and abrasion-resistant steel having a Brinell hardness ("HB") of 400 HB to 600 HB.

13. The driver according to claim 1, wherein a ratio of a length of the wear plate to a length of the scraper wing is between 50%-100%.

14. The driver according to claim 1, wherein a ratio of a length of the wear plate to a length of the scraper wing is between 65%-90%.

15. The driver according to claim 1, wherein the wear plate has a height and the scraper wing has, at its highest point, a height, wherein the ratio of the height of the wear plate to the height of the scraper wing is between 8%-35%.

16. The driver according to claim 1, wherein a ratio of a height of the wear plate to a height of the scraper wing is between 10%-20%.

17. The driver according to claim 1, wherein a ratio of a width of the wear plate to a width of the scraper wing is between 60%-120%.

* * * * *